Patented Sept. 8, 1953

2,651,590

UNITED STATES PATENT OFFICE 2,651,590

FUMIGANT COMPOSITION AND PROCESS

Kenneth S. Karsten, Westport, Conn., assignor to R. T. Vanderbilt Company, Inc., New York, N. Y., a corporation of New York No Drawing. Application April 13, 1951, Serial No. 220,965

4 Claims. (Cl. 167—22)

My invention relates to new pesticides which are active in the vapor phase and also on contact. My invention also relates to methods for the application of such pesticides.

A number of vapor phase pesticides, such as formaldehyde, methyl bromide, bromine, ethylene dichloride, para dichlorobenzene, nitrogen trichloride, diphenyl and chloropicrin, have been used for various preservative purposes, and are useful and of value in controlling certain molds, bacteria, and insect pests. They have, however, certain disadvantages, such as specificity, susceptibility to decomposition or too ready volatility for sustained effect.

I have found that compounds falling within the scope of the formula

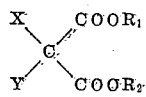

wherein X is bromine or chlorine, wherein Y is hydrogen, bromine or chlorine and $R_1$ and $R_2$ are alkyl radicals having from 1 to 4 carbon atoms, or mixtures of such compounds, provide a new and effective means for controlling fungi, bacteria and insects. Of the compounds falling within the generic formula just stated, I have found that diethyl dibromomalonate is outstanding from the standpoint of its effectiveness.

These chemicals provide a new and effective means for sterilizing surfaces simply by placing the materials to be sterilized in an enclosed vessel in which a small amount of the chemical is allowed to vaporize. Moreover, these chemicals have a pleasant odor and can be used in a number of ways in which pesticides have been heretofore used in the art, for example, as aerosols, in impregnated paper, in impregnated powders, in water emulsions, in solution in oils, and so forth, to provide an environment in which the chemicals are present. The chemicals are also useful as preservatives for paste, paint, cutting oils, textiles, and so forth.

The following examples illustrate the diversity of ways in which these compounds are useful.

Example I

Wheat was treated with 0.1% by weight of diethyl bromomalonate by tumbling, and was thereafter placed in a closed container. Adult confused flour beetle insects placed in the container with the treated seeds died in less than twenty-four hours. Insects placed in a similar container with untreated wheat remained alive.

Example II

One gram of diethyl bromomalonate was impregnated on 5 grams of cotton batting, and the impregnated batting was placed in a closed container of 50,000 ml. inside volume. The container was kept closed for thirty-six hours. Open Petri dishes containing agar culture medium freshly inoculated with a mold (Aspergillus niger) and with bacteria (Micrococcus aureus) were then placed in the container. The Petri dishes were thereafter removed at intervals of time and it was found that the bacteria were killed by exposure to the vapors of the chemical for forty-eight hours. The mold was inhibited, but was not killed. Only a small part of the compound, approximately 0.01 gram, vaporized during the forty-eight hour period.

Example III

In this example, the procedure of Example II was repeated, 1 gram of diethyl dibromomalonate being used in place of the diethyl bromomalonate used in Example II. It was found that the mold and the bacteria were killed by the vapors of the chemical in twenty-four hours.

Example IV

A bundle of dry broom corn was placed in a 13 gallon wax-lined fiber drum. An open pan of water was placed in the drum with the broom corn to maintain a relative humidity of 100%. A quantity of diethyl bromomalonate was then placed on a small wad of cotton in the bottom of the drum at some distance from the broom corn, and the drum was then kept closed except during examination. 0.1 ml. of diethyl bromomalonate prevented mold growth on the broom corn for three weeks, and 1 ml. prevented mold growth for more than 6 weeks. Broom corn set up under comparable conditions, but with the diethyl bromomalonate absent, was covered with a heavy mold growth in one week.

Example V

The procedure of Example IV was repeated, but using diethyl dibromomalonate in place of diethyl bromomalonate. 0.1 ml. of the diethyl dibromomalonate prevented mold growth for four weeks, and 1 ml. thereof prevented mold growth for more than six weeks.

Example VI

Diethyl bromomalonate in the amount of 2% by weight was incorporated into a water-emulsifiable machine tool cutting oil. The concentrate was then diluted with 20 volumes of water. 5% by weight of iron chips were added to the water emulsion, and the emulsion was then inoculated with 1 cc. of spoiled oil per 200 ml. of water emulsion. Bacterial plate counts were made at the start of the test, and after 7, 14, 21, 28 and 35 days. After 35 days the bacterial count on untreated oil emulsion, which was used as a blank, was 38 million bacteria per ml., the count on the emulsion containing 2% diethyl bromomalonate being half a million. The original bacterial count after inoculation was 200,000 bacteria per ml.

*Example VII*

The procedure of Example VI was repeated, using diethyl dibromomalonate in place of the diethyl bromomalonate. After 35 days, the bacterial count of the emulsion was 10,000 bacteria per ml.

*Example VIII*

A 0.4% by weight solution in water of ordinary hard soap was prepared. To this solution was added 2% by weight, based upon the weight of the soap, of diethyl bromomalonate. To 200 ml. of the soap and toxicant solution was added 1 ml. of a twenty-four hour nutrient broth culture of M. aureus. The soap solution was allowed to stand for fifteen minutes, and then a bacterial plate count was made on the solution. The count on the untreated control soap solution was 200,000 bacteria per ml., whereas that on the sample which had been treated with diethyl bromomalonate was 70,000 bacteria per ml.

*Example IX*

The procedure of Example VIII was repeated, using diethyl dibromomalonate in place of diethyl bromomalonate. The solution containing the diethyl dibromomalonate had a count of 27,000 bacteria per ml. upon standing for the 15 minute period.

*Example X*

Diethyl bromomalonate was incorporated into a 5% solution of casein, a commercially used adhesive solution, in a concentration of 0.1%, based on the weight of the dry adhesive. Untreated casein solution used as a blank spoiled in nine days, whereas the casein solution containing the diethyl bromomalonate was still unspoiled after sixty days.

*Example XI*

The procedure of Example X was repeated, using diethyl dibromomalonate in place of diethyl bromomalonate. In this case too, the casein solution containing the toxicant was unspoiled after sixty days.

*Example XII*

Diethyl bromomalonate was incorporated into a 5% solution of soya flour, a commercially used adhesive solution, in a concentration of 0.5%, based on the weight of the dry adhesive. The solution used as a blank and containing no toxicant putrefied in six days, whereas the solution containing the diethyl bromomalonate was protected for forty-six days.

*Example XIII*

The procedure of Example XII was repeated, using diethyl dibromomalonate in place of the diethyl bromomalonate. In this case, spoilage of the soya flour solution was prevented for more than forty-six days.

Various modifications may be made in the procedures of the specific examples to provide other embodiments which fall within the broad scope of my invention. Thus, as has been stated above, the toxicants defined by the generic formula given above can be applied in the same manner in which volatile, liquid toxicants have heretofore been used. For example, aerosols may be prepared composed of about 2 parts by weight of the toxicant, such as diethyl dibromomalonate, and about 98 parts by weight of a suitable propellant, such as Freon 12 or methyl chloride.

Furthermore, impregnated powders may be prepared by suitably admixing from about 5 to about 50 parts by weight of diethyl dibromomalonate or one of the other toxicants mentioned above with from about 95 to about 50 parts by weight of a suitable solid carrier, such as prophyllite, chalk, pyrethrum marc, diatomaceous earth, walnut shell flour, and so forth. As is well understood in the art, the particular amounts of toxicant and solid carrier chosen will depend upon various factors, such as the ability of the solid carrier to absorb the toxicant and upon the particular strength desired for the final composition.

Where it is desired to employ the toxicant emulsified in water, a mixture of, for example, 95 parts by weight of diethyl dibromomalonate or other compounds falling within the scope of the generic formula given above may be mixed with 5 parts by weight of Triton X–100 to form an emulsion concentrate, which can be dispersed in water using 2 pounds of concentrate per 100 gallons of water. Also, if desired, an emulsion concentrate which may similarly be dispersed in water may be prepared using, for example, 50 parts by weight of diethyl dibromomalonate, 40 parts by weight of isopropyl alcohol and 10 parts by weight of monoethanol ammonium oleate.

Where it is desired to use the toxicant in solution, suitable solutions can be prepared using xylene, alkyl naphthalenes or kerosene as the solvent. The compositions of my invention find application in the preservation of fruits, such as apples, peaches, oranges and bananas, which are being transported or stored. They are also highly useful in the preservation of freshly harvested farm crops, such as hay, grain, seed, corn, and so forth, which are undergoing curing. A wide variety of applications for my compositions will suggest themselves to those who are skilled in this field.

I claim:

1. A pesticidal composition of matter comprising as an active ingredient at least one compound of the formula

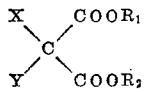

wherein X is selected from the group consisting of bromine and chlorine, wherein Y is selected from the group consisting of hydrogen, bromine and chlorine and wherein $R_1$ and $R_2$ are alkyl radicals having from 1 to 4 carbon atoms and a solid adsorbent carrier therefor.

2. A composition as in claim 1 in which X and Y are bromine and in which $R_1$ and $R_2$ are ethyl.

3. A method for the preservation of materials subject to pesticidal attack which comprises contacting such materials with at least one compound of the formula

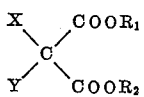

wherein X is selected from the group consisting of bromine and chlorine, wherein Y is selected from the group consisting of hydrogen, bromine and chlorine and wherein $R_1$ and $R_2$ are alkyl radicals having from 1 to 4 carbon atoms in an amount effective to prevent such attack.

4. A method as in claim 3 in which X and Y are bromine and in which $R_1$ and $R_2$ are ethyl.

KENNETH S. KARSTEN.

References Cited in the file of this patent

FOREIGN PATENTS

| Number | Country | Date |
|---|---|---|
| 502,600 | Germany | June 30, 1930 |

OTHER REFERENCES

"Organic Chemistry" by Victor Von Richter P. Blakiston's Son and Company, Philadelphia, Pennsylvania (1919) at page 491.

"A Second Index of Patented Mothproofing Materials" by R. C. Roark. U. S. Department of Agriculture, Bureau of Chemistry and Soils, Insecticide Division, February 1933 at page 32.

J. Agri. Research, volume 12, pages 579 to 587 (1918).

Chemical Abstracts, volume 16, page 2848[5].